Feb. 16, 1965 E. CARLSON ETAL 3,169,416
BORING HEAD AND METHOD OF USING SAME
Filed Sept. 5, 1961 4 Sheets-Sheet 1
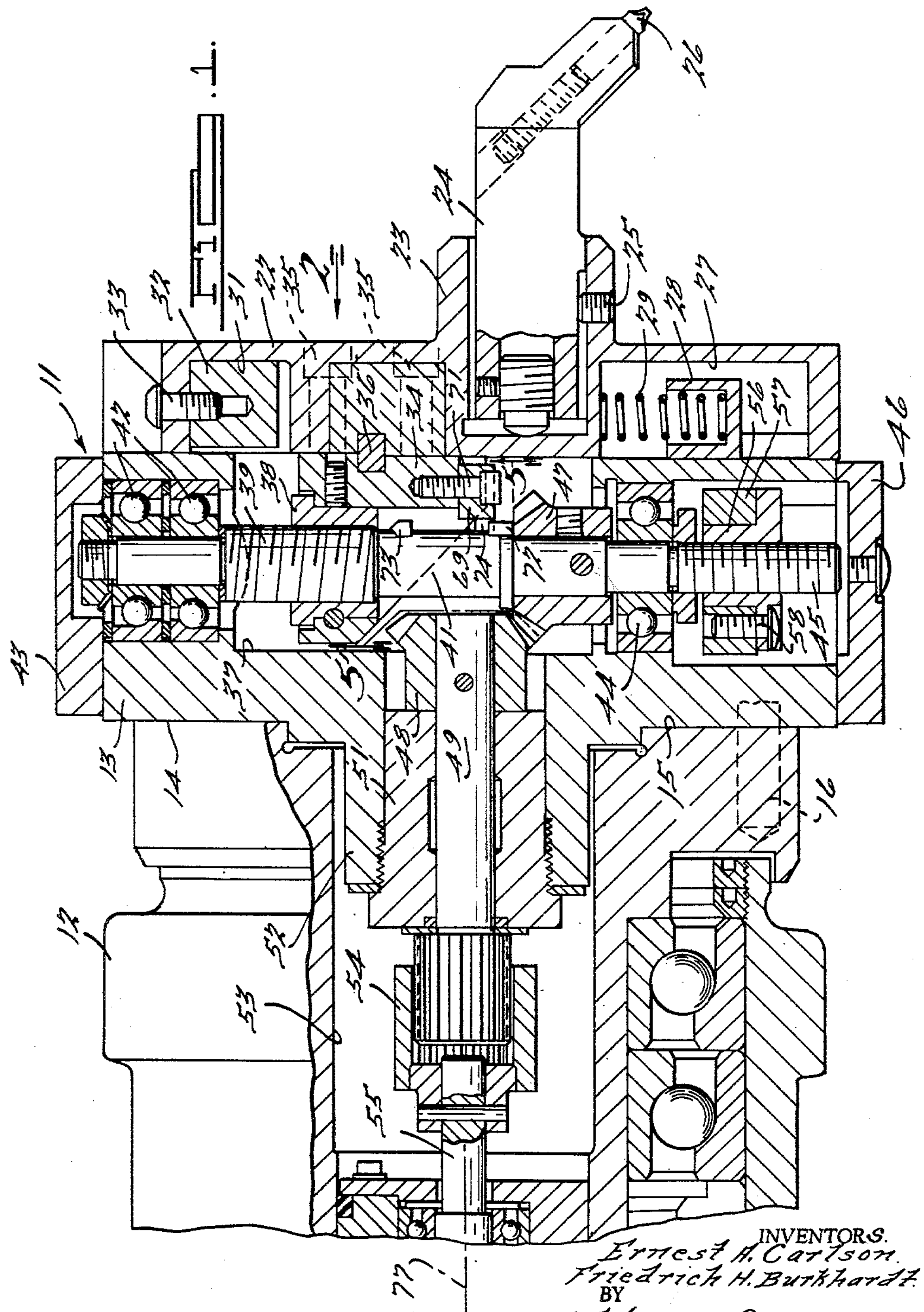
INVENTORS.
Ernest H. Carlson
Friedrich H. Burkhardt
BY
Harness, Dickey & Pierce
ATTORNEYS BORING HEAD AND METHOD OF USING SAME
Filed Sept. 5, 1961 4 Sheets-Sheet 2
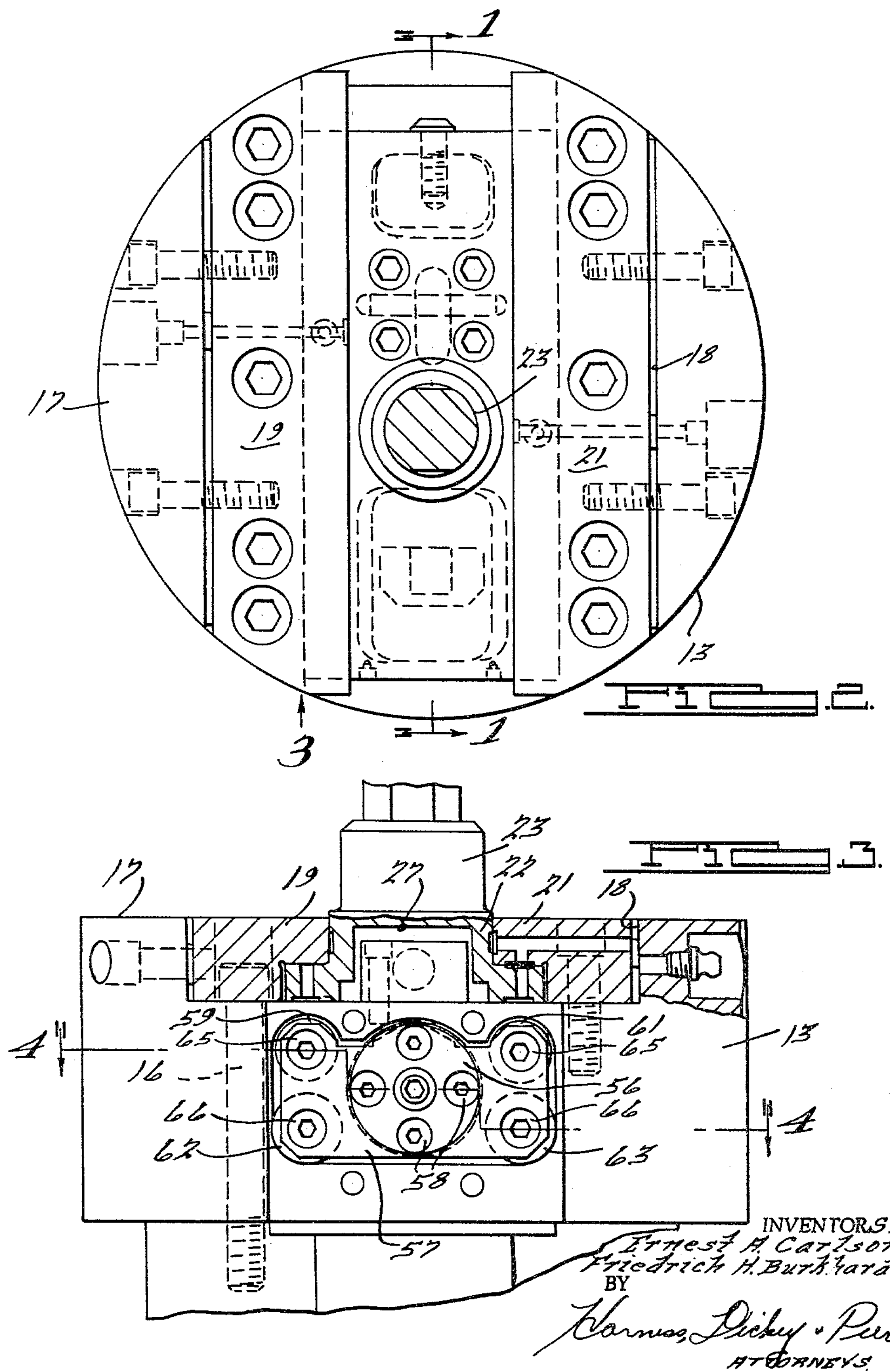
INVENTORS.
Ernest A. Carlson
Friedrich H. Burkhardt
BY
Harness, Dickey & Pierce
ATTORNEYS

BORING HEAD AND METHOD OF USING SAME

Filed Sept. 5, 1961 4 Sheets-Sheet 3

INVENTORS.
Ernest A. Carlson
Fredrich H. Burkhardt
BY
Harness, Dickey & Pierce
ATTORNEYS BORING HEAD AND METHOD OF USING SAME
Filed Sept. 5, 1961 4 Sheets-Sheet 4
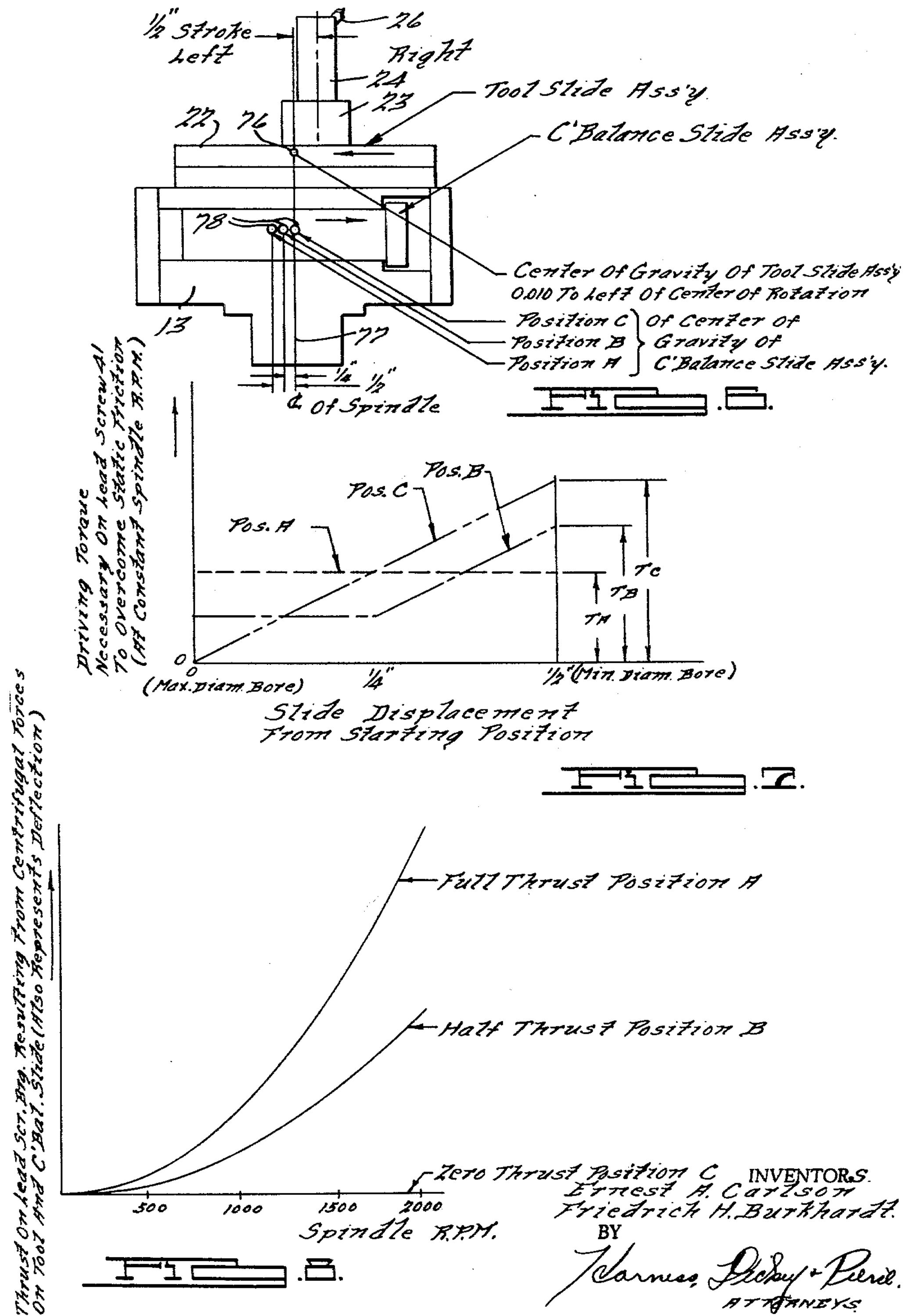
INVENTORS.
Ernest A. Carlson
Friedrich H. Burkhardt
BY
Harness, Dickey + Pierce
ATTORNEYS United States Patent Office 3,169,416
Patented Feb. 16, 1965

3,169,416

BORING HEAD AND METHOD OF USING SAME

Ernest Carlson, Birmingham, Mich., and Friedrich H. Burkhardt, Eislingen, Baden-Wurttemberg, Germany, assignors to Ex-Cell-O Corporation, Detroit, Mich., a corporation of Michigan Filed Sept. 5, 1961, Ser. No. 135,863
12 Claims. (Cl. 77—58)

This invention relates to boring machines, and more particularly to tool heads for use in automatic precision boring.

It is an object of the invention to provide a novel and improved boring head especially adapted for work of high accuracy, and which permits adjustment of the tool feed for different bore diameters without the necessity of interrupting spindle rotation, thus increasing accuracy and avoiding the necessity of multiple tools.

It is another object to provide an improved boring head of the above nature which eliminates backlash problems in the tool feed mechanism and insures concentricity of stepped diameters in a workpiece.

It is also an object to provide an improved boring head having the above characteristics, which is especially adapted for small-run jobs of high accuracy and which greatly reduces setup time, tooling and stock requirements.

It is another object of the invention to provide an improved boring head construction of this character, which may be used to bore a plurality of workpieces in succession without danger of scoring each machined bore while the tool is being withdrawn from said bore for insertion in the next workpiece.

It is a further object to provide an improved boring head construction which is versatile in nature and can be adjusted to suit various required spindle speeds, permitting the tool setting to be changed at such spindle speeds.

Other objects, features, and advantages of the present invention will become apparent from the subsequent description, taken in conjunction with the accompanying drawings, in which:

FIGURE 1 is a cross-sectional view in elevation taken along the line 1—1 of FIGURE 2 and showing the boring head mounted on a boring machine spindle;

FIGURE 2 is a front elevational view of the boring head taken in the direction of the arrow 2 of FIGURE 1;

FIGURE 3 is a bottom plan view, partly sectioned and taken in the direction of the arrow 3 of FIGURE 2;

FIGURE 6 is a schematic view of the boring head components, illustrating the manner of operation;

FIGURE 7 is a diagram showing the variation in static driving torque required to rotate the lead screw as a function of the slide displacement; and FIGURE 8 is a chart showing the variation of thrust on the lead screw bearing as a function of the rotational speed of the spindle.

Figure 4:
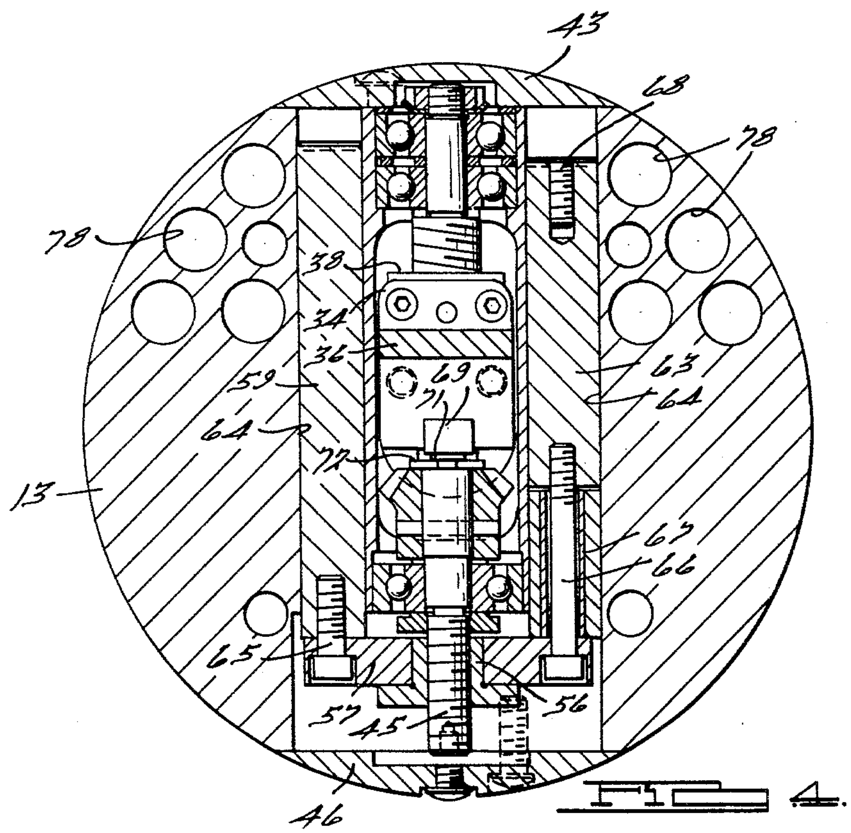
FIGURE 4 is a cross-sectional view in elevation taken along the line 4—4 of FIGURE 3.

In general terms, the illustrated embodiment of the invention comprises a boring head adapted to be mounted on the outer end of a rotary boring machine spindle. Such a machine may be of the type having a work carrier adjustable to position the work on the spindle centerline and movable to feed the work axially toward the spindle.

The boring head has a radially adjustable tool slide and a lead screw to which the tool slide is connected, the lead screw being rotatable by a servo drive concentric with the spindle through bevel gears.

The lead screw has two threads of opposite hands, one for adjusting the tool slide and the other for adjusting a counterbalance slide assembly movable in a direction opposite to the direction of movement of the tool slide. The tool slide assembly and counterbalance slide assembly are of equal weight. By preselecting the relative locations of the centers of gravity of the tool slide assembly and the counterbalance slide assembly, the resultant axial thrust on the lead screw may be made practically zero regardless of the adjusted position of the tool slide. There will thus be no bearing deflection, resulting in extremely accurate settings for various bore diameters and spindle speeds. Since the bore diameter may be changed while the spindle continues to rotate, only a single tool being used, accuracy of the various diameters will be assured.

Alternatively, the relative positions of the centers of gravity of the tool slide assembly and counterbalance slide assembly may be preselected so as to reduce to a minimum the torque required from the servo drive to overcome static friction and initiate rotation of the lead screw in any tool slide position while the spindle is rotating. This will increase the range of permissible spindle speeds, since static friction is proportional to the centrifugal force on the slide assemblies. Any settings between these two alternatives may also be chosen.

Referring more particularly to the drawings, the boring head of this invention is generally indicated at 11 and is shown as being secured to the outer end of a boring machine spindle 12. This machine may, for example, be of the type having means (not shown) for simultaneously supporting a number of workpieces on spaced parallel axes, the workpiece supporting means being positionable vertically and horizontally to align successive workpieces with the spindle centerline, and being movable axially toward the spindle to feed the workpiece during the boring operation.

Boring head 11 comprises a housing 13 having a surface 14 adapted to be secured to the outer surface 15 of spindle 12 by a plurality of bolts 16. Housing 13 is of generally circular shape, having a flat outer surface 17 as seen in FIGURE 3 provided with a central recess 18. A pair of tool slide retaining guides 19 and 21 are situated in spaced parallel relation within recess 18, and a tool slide 22 is slidably mounted within the guides, the tool slide resting on the bottom of recess 18 and being retained by inwardly projecting guide portions which overlap outwardly projecting tool slide portions.

Tool slide 22 is of elongated shape and has an outwardly extending hollow portion 23 within which is secured a tool supporting bar 24. Bar 24 is secured within extension 23 by a set screw 25, and a number of interchangeable bars may be provided for different required sizes of bores. A tool 26 is carried by the outer end of bar 24.

A hollow portion 27 is provided within slide 22, as seen in FIGURES 1 and 3, and a spring supporting bracket 28 is secured to housing 13 within this recess. A helical compression spring 29 is disposed between bracket 28 and slide 22, urging the slide upwardly as seen in FIGURE 1. As will later become evident, this spring serves to remove backlash from the tool slide lead screw drive when spindle 12 is not rotating. A second recessed portion 32 is provided within the end of slide 22 opposite that having recess 27, and a counterweight 32 is secured by a fastener 33 within this recess. A nut supporting bracket 34 is secured to the inner surface of slide 22 by means of a plurality of bolts 35 and key means 36. A recessed portion 37 is provided in head 13, bracket 34 being disposed within this recessed portion. A nut 38 is secured to bracket 34, this nut being threaded on a first thread 39 of a lead screw 41 rotatably mounted in housing 13.

Lead screw 41 is rotatably supported at one end by a pair of combined radial and thrust anti-friction bearings 42, these bearings being enclosed by a cap 43 secured to housing 13. Lead screw 41 is supported adjacent its opposite end by an anti-friction bearing 44 carried by housing 13, and a second threaded portion 45 extends outwardly from the portion of lead screw 41 supported by bearing 44, as seen in FIGURE 1. This thread is of opposite hand to threaded portion 39. A cap 46 is secured to housing 13 adjacent threaded portion 45 of screw 41.

A bevel gear 47 is secured to screw 41 inwardly of bearing 44 and meshes with a bevel driving pinion 48 secured to a shaft 49 positioned at right angles to screw 41. Shaft 49 is supported by a bearing 51 mounted within an extension 52 of housing 13, this extension being disposed within a bore 53 of spindle 12. A splined coupling 54 connects shaft 49 to a shaft 55 extending from a transducer driven by a servo motor through a gear head and slip clutch, these components not being shown but being disposed within spindle 12. The servo motor may be driven in response to prerecorded signals such as a control tape for intermittently rotating screw 41 so as to adjust the radial position of tool 26 as successve bores are machined. Such a prerecorded signal means could also be used to control the positioning and movement of the workpiece carrier.

Customarily, tool 26 will initially be set at the largest diameter to be cut during a machining sequency, and will be shifted inwardly from time to time in order to machine bores of smaller diameter, whether they be in the same or another workpiece mounted on the workpiece carrier. In this manner, backlash problems which might result if feed screw 41 were reversed during a machining sequence are avoided; also, a workpiece may be backed away axially from tool 26 after its bore has been machined and tool 26 has been stepped inwardly to the next diameter to be cut, without tool 26 scoring the machined workpiece as it is withdrawn.

A counterbalance assembly feed nut 56 is mounted on thread 45 on lead screw 41, and a counterbalance mounting bracket 57 is secured to nut 56 by bolts 58. Bracket 57 is of generally rectangular shape, as seen in FIGURE 3, and four counterbalance weights 59, 61, 62 and 63 are secured thereto and extend in spaced parallel relation within bores 64 formed in housing 13.

Weights 59 and 61 are relatively long and are secured to bracket 57 by bolts 65. Weights 62 and 63 are relatively short and of slightly larger diameter than weights 59 and 61, being secured to bracket 57 by bolts 66 and spacers 67. The outer ends of weights 62 and 63 have adjustable screws 68 for determining (together with the lengths of spacers 67) the exact position of the center of gravity of the counterbalance assembly, for purposes later described.

Figure 5:
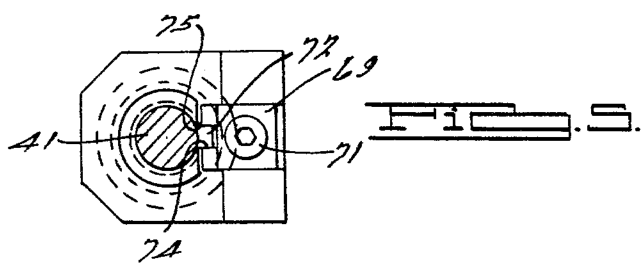
FIGURE 5 is an enlarged fragmentary cross-sectional view taken along the line 5—5 of FIGURE 1 and showing the limit stops for the lead screw.

Means are provided for stopping rotation of lead screw 41 at the limits of movement of tool 26. This means includes a stop member 69 secured to tool slide feed nut bracket 34 by a bolt 71, and extending toward the central portion of lead screw 41. This portion of the screw carries a pair of spaced projections 72 and 73, seen best in FIGURE 1. Stop 69 has an upwardly projecting surface 74 engageable by projection 72 when screw 41 is rotated clockwise in FIGURE 5 a sufficient number of turns to move stop 69 downwardly in FIGURE 1 into obstructing relation with projection 72. A downwardly facing surface 75 on stop 69 is engageable by projection 73 when screw 41 has been rotated counterclockwise in FIGURE 5 a sufficient distance to move stop 69 into obstructing relation with projection 73. There is thus provided a positive stopping means which prevents the possibility of jamming of the screw threads or their associated parts in the limiting positions of the tool slide. Engagement of either projection 72 or 73 with stop 69 will not harm the mechanism, since the slip clutch (not shown) mentioned above will permit continued rotation of the servo motor.

The operation of the invention may perhaps best be described with respect to schematic FIGURE 6 and the charts shown in FIGURES 7 and 8. According to the invention, the total weight of the tool slide assembly is made substantially equal to the total weight of the counterbalance assembly. The tool slide assembly comprises tool 26, tool bar 24, slide 22, feed nut 38, bracket 34, weight 32, and bolt 33. The counterbalance assembly comprises the four weights 59 to 63, made of a suitably dense metal, the four screws 65 and 66, spacers 67, bracket 57, nut 56, screws 58 and adjusting screws 68. In a suitable embodiment of the invention, the difference between these two assemblies was reduced to less than one-quarter of an ounce. Weights 59 to 63 as well as weight 32 may be trimmed to obtain this balance.

Two main problems in the achievement of boring speed and accuracy are affected by the novel boring head construction. One problem concerns the driving torque which must be applied to lead screw 41 in order to overcome the static friction exerted on the screw threads by centrifugal forces acting on the assembly or assemblies driven by such threads. With a constantly rotating spindle 12, the radial distance from the spindle centerline of the center of gravity of a tool slide assembly driven by the feed screw will affect the amount of this static friction. It is highly desirable to have a mechanism capable of radially adjusting the boring tool while the spindle continues to rotate in order to achieve maximum bore accuracy. It may also be desirable on certain jobs to have a relatively high rotational spindle speed, and since the maximum driving torque of the servo motor available through the aforementioned slip clutch is limited, means for controlling the static friction on the lead screw threads is of consequence.

Another important force affecting the accuracy of the boring head is the resultant axial thrust on the lead screw which reacts against the thrust bearings. A variation in this thrust, for example, at different radial tool positions or at different spindle speeds, will cause a variation in deflection of tool 26, resulting in inaccurately formed bores, or in the case of stepped bores within a single workpiece, resulting in bores which are off center with respect to each other.

According to the invention, the center of gravity 76 of the tool slide assembly is so located with respect to the spindle centerline 77 as to remain on one side of this centerline throughout the traverse movement of the tool slide assembly. This is seen in FIGURE 6 where, for illustrative purposes, a tool slide assembly having a ½ inch stroke is shown, the assembly being in its extreme outer position to the right of the spindle centerline in FIGURE 6. At this time, center of gravity 76 is at or very slightly (for example, 0.010 inch) to the left of the spindle centerline, that is, substantially in a plane passing through centerline 77 at right angles to the path of tool slide movement. As the tool slide assembly is moved to the left during a series of boring operations, center of gravity 76 will move further to the left of the spindle centerline. This means that nut 38 will always bear against screw 41 in one direction, eliminating backlash problems.

The center of gravity 78 of the counterbalance slide assembly, which will move to the right as the tool slide assembly moves to the left, has an initial position dependent upon the particular requirements of the job. Three illustrated initial positions of the center of gravity of the counterbalance slide assembly are shown. In position A, the center of gravity 78 is ½ inch to the left of spindle centerline 77, and in its final position will be on the spindle centerline. In position B, the center of gravity of the counterbalance slide assembly is initially ¼ inch to the left of the spindle centerline in FIGURE 6, and in its final position will be ½ inch to the right of this centerline. In position C, the center of gravity is initially on the spindle centerline or very slightly to the right of it, and in its final position will be ½ inch to the right of the spindle centerline in FIGURE 6.

The center of gravity of housing 13 and all the parts which are rigidly attached to it is so adjusted as to be exactly on spindle centerline 77, with the housing in dynamic balance. This is accomplished by providing a plurality of lightening holes 79 as seen in FIGURE 4, these holes being formed in housing 13 and being so positioned as to achieve the desired location of the center of gravity.

FIGURE 7 shows the driving torque necessary on lead screw 41 to overcome static friction at various slide positions and for the three positions of the counterbalance slide assembly center of gravity. The abscissa of this chart is designated as slide displacement from starting point, with zero representating the outermost slide position and ½ inch representing the innermost slide position. (Note that slide displacement from the starting point is toward the right in FIGURE 7, but toward the left in FIGURE 6.) Since this chart is for illustrative purposes only, the ordinate, driving torque necessary on lead screw 41 to overcome static friction, is not calibrated, but increases upwardly.

When center of gravity 78 of the counterbalance slide assembly is in position A, the driving torque necessary on lead screw 41 to overcome static friction will be constant regardless of the position of the tool slide. This may perhaps best be understood by considering the fact that when the tool slide assembly is in its outermost or starting position (zero in FIGURE 7), its center of gravity would be practically on the spindle centerline. Since the centrifugal force which creates friction between the nut and lead screw will be zero, the static friction between nut 38 and threads 39 will be practically zero. (Although there will always be some friction due to contact between the parts, this may be regarded as zero for purposes of the explanation.)

However, center of gravity 78 of the counterbalance slide assembly will be spaced ½ inch from the spindle centerline at the zero or starting slide position, and there will thus be substantial centrifugal force creating static friction between nut 56 and threads 45. The total driving force necessary on lead screw 41 to overcome static friction will therefore be equal to the static friction between nut 56 and threads 45.

Considering now the maximum slide displacement position (½ inch in FIGURE 7), at this position of center of gravity 76 will be spaced ½ inch to the left of centerline 77 in FIGURE 6, whereas center of gravity 78 will be on centerline 77. The only static friction will therefore occur between nut 38 and threads 39. Since the weights of the tool slide and counterbalance slide assemblies are equal, the driving force necessary on lead screw 41 to overcome the total static friction will be the same as at the zero or starting position.

At any intermediate position of the slide, it will be obvious that the total driving force necessary on lead screw 41 will be the same as at the extreme positions. This is because as center of gravity 76 moves away from the spindle centerline, center of gravity 78 will move toward it an equal distance. Since centrifugal force is a product of the square of the rotational speed and the radial distance from the center of rotation, the total centrifugal force of both assemblies, and therefore the total static friction on the lead screw threads will remain constant as long as the spindle speed does not vary.

Considering now starting position B of center of gravity 78, the first part of the FIGURE 7 curve will be parallel to but lower than the curve for position A. This is because center of gravity 78 will start from a position ¼ inch away from the spindle centerline (as against ½ inch for position A), and will approach the spindle centerline as center of gravity 76 moves away from it. After the ¼ inch position is passed, however, both centers of gravity 76 and 78 will move away from the spindle centerline. Their effect on centrifugal force and therefore on static friction of the lead screw threads will therefore be cumulative, resulting in the curve shown in FIGURE 7.

In starting position C of center of gravity 78, both centers of gravity 76 and 78 will move away from the spindle centerline throughout the range of movement of the tool slide assembly. The driving torque necessary on lead screw 41 to overcome static friction will, therefore, increase steadily as the tool slide is set at smaller and smaller bore diameters, as shown by the sloping curve for position C in FIGURE 7.

Since in any given installation there will be a maximum available driving torque from the servo motor through its slip clutch for rotating lead screw 41, it is important to consider the maximum necessary driving torque for positions A, B and C. These maximum driving torques are indicated at $T_A$, $T_B$ and $T_C$ in FIGURE 7. It will be noted that with center of gravity 78 of the counterbalance slide assembly in position A, the maximum required driving torque will be lower than the maximum torque at any other position of center of gravity 78, for a given spindle speed. Therefore, positioning center of gravity 78 at position A will permit relatively higher spindle speeds without detracting from the ability of the servo motor to adjust tool 26. With the center of gravity 78 at position C, the maximum required driving torque will be the highest, and this will occur when the slide is in its innermost position and is to be moved outwardly to its starting position for another boring cycle. Since it is desired that the spindle continue to rotate while the tool slide is being reset to its starting position, the choice of position C for the counterbalance slide assembly center of gravity must take into consideration the required spindle speed.

The main advantage of position C for center of gravity 78 is the reduction of the resultant axial thrust by lead screw 41 against its thrust bearings 42 to practically zero, regardless of variations in spindle speed. This is seen in FIGURE 8, which shows the variation in resultant thrust on the lead screw bearings with rotational spindle speed for positions A, B and C of center of gravity 78.

When center of gravity 78 is initially in position A, there will always be an out-of-balance condition of unit 11 with respect to the spindle centerline, regardless of the adjusted position of the tool slide. This is because center of gravity 76 of the tool slide assembly will move away from the spindle centerline as center of gravity 78 moves toward this centerline. Furthermore, the common center of gravity of the tool slide and counterbalance slide assemblies will always be ¼ inch from the spindle centerline, regardless of the tool slide position.

If it is assumed that center of gravity 78 of the counterbalance slide assembly is above spindle centerline 77 as seen in FIGURE 1, there will be a resultant upward thrust on bearings 42, and this thrust will vary as the square of the spindle speed. The resulting deflection of bearing 42 will cause a shift of tool 26, thus contributing to inaccuracy of any given tool setting. It should be kept in mind that each tool setting will be governed by means for measuring the total number of rotations or partial rotations of the servo motor from the previous position, and this counting or feed-back mechanism will not be aware of errors caused by bearing deflection. Furthermore, the error due to deflection will not be the same as the rotational spindle speed is varied. In any case, deflection of bearing 42 caused by an upward thrust in FIGURE 1 on lead screw 41 will result in a smaller diameter bore than would otherwise be the case.

When center of gravity 78 of the counterbalance slide assembly is in position B, the common center of gravity of the tool slide and counterbalance slide assemblies will be ⅛ inch to the left of the spindle centerline in FIGURE 6, regardless of the adjusted position of the tool. The resultant axial thrust on lead screw 41 will thus be half of that for position A, as shown in FIGURE 8. As in the previous case, the thrust will increase in proportion to the square of the rotational spindle speed.

When center of gravity 78 is in position C, the common center of gravity of the two slide assemblies will always be substantially coincident with the spindle centerline regardless of the adjusted lead screw position. There will therefore be a zero resultant thrust on lead screw 41, and no tool setting error due to bearing deflection at any tool position or at any spindle speed.

Although the invention permits selection of the type of performance for unit 11 in accordance with the principles described above, it should be pointed out that positioning of center of gravity 78 of the counterbalance slide assembly so as to create a resultant thrust on lead screw 41, while serving to reduce the maximum driving torque necessary on the lead screw to overcome static friction, poses a substantial problem with respect to tool position error. This is because, in a normal boring sequence, it is necessary to vary the rotational spindle speed. An ordinary machining sequence may involve successive boring of workpieces fabricated of different materials, with respect to which different tool surface speeds must be maintained. Moreover, to maintain a given surface speed, the rotational spindle speed would have to be varied as the bore diameter changes. As described above, a change in spindle speed will cause an exponential change in thrust on the lead screw, resulting in a wide variation in tool deflection.

If it is desired to readjust the position of center of gravity 78, this may be done by changing the length of spacers 67 for one or both of weights 62 and 63. Position C of center of gravity 78 may be chosen as 0.010 inch to the right of centerline 77 when center of gravity 76 is 0.010 inch to the left. However, the exact position of the center of gravity 78 is not as critical as that of center of gravity 76, since backlash between nut 56 and thread 45 will not affect the position of tool 26.

While it will be apparent that the preferred embodiment of the invention disclosed is well calculated to fulfill the objects of the invention, it will be appreciated that the invention is susceptible to modification, variation and change without departing from the proper scope or fair meaning of the subjoined claims.

What is claimed is:

1. In a boring head, a housing adapted to be secured to a spindle, a tool slide assembly having a tool, means on said housing supporting said tool slide assembly for lateral movement with respect to the spindle centerline, and means for limiting the extreme positions of said lateral movement, the positions of said limiting means relative to the center of gravity of said tool slide assembly and said spindle centerline being such that at all points between said extreme positions said center of gravity will be to one side of a plane passing through said centerline at right angles to the path of movement of said tool slide assembly, said tool being on the other side of said plane.

2. In a boring head, a housing adapted to be secured to a spindle, a tool slide assembly having a tool and carried by said housing for lateral movement with respect to the spindle centerline between extreme positions, a lead screw rotatably mounted within said housing, a nut on said lead screw connected to and forming a part of said tool slide assembly, and limiting means for defining said extreme positions, the positions of said limiting means relative to the center of gravity of said tool slide assembly and said spindle centerline being such that at all points between said extreme positions said center of gravity will be to one side of a plane passing through said centerline at right angles to the path of movement of said tool slide assembly, said tool being on the other side of said plane.

3. In a boring head, a housing adapted to be secured to a spindle, a tool slide assembly on said housing having a tool and mounted for lateral movement with respect to the spindle axis between first and second extreme positions, limiting means for defining said extreme positions, the positions of said limiting means relative to the center of gravity of said tool slide assembly and said spindle centerline being such that at all points between said extreme positions said center of gravity will be to one side of a plane passing through the centerline at right angles to the path of movement of said tool slide assembly, a lead screw rotatably mounted within said housing, a nut on said lead screw connected to and forming part of said tool slide assembly, a drive shaft coaxial with the spindle axis rotatably supported by said housing at right angles to said lead screw, and bevel gearing connecting said drive shaft and lead screw.

4. In a boring head, a housing adapted to be secured to a hollow spindle, a tool slide assembly supported by said housing for lateral movement with respect to the spindle centerline, means for limiting the extreme positions of said tool slide assembly, the positions of said limiting means relative to the center of gravity of said tool slide assembly and said spindle centerline being such that at all points between said extreme positions said center of gravity will be to one side of a plane passing through said centerline at right angles to the path of movement of said tool slide assembly, a spring disposed between said tool slide assembly and housing and urging the tool slide assembly in a direction tending to separate said center of gravity from said spindle centerline, a lead screw rotatably mounted within said housing and connected to said tool slide assembly, a drive shaft rotatably supported by said housing coaxially with the spindle centerline, and bevel gearing operatively connecting said drive shaft and lead screw.

5. In a boring head, a housing adapted to be secured to a spindle, a tool slide assembly supported by said housing for lateral movement with respect to the spindle centerline, means for limiting the extreme positions of said tool slide assembly, the positions of said limiting means relative to the center of gravity of said tool slide assembly and said spindle centerline being such that at all points between said extreme positions said center of gravity will be to one side of a plane passing through said centerline at right angles to the path of movement of said tool slide assembly, a counterbalance slide assembly carried by said housing, the total weight of said tool slide assembly being substantially equal to the total weight of said counterbalance slide assembly, and means for simultaneously moving said tool slide assembly and counterbalance slide assembly in opposite directions.

6. In a boring head, a tool slide assembly having a tool, means for securing said assembly to a spindle, means for adjusting said assembly laterally with respect to the spindle centerline while so attached, means for limiting the extreme positions of said adjustment, the positions of said limiting means relative to the center of gravity of said tool slide assembly and said spindle centerline being such that at all points between said extreme positions said center of gravity will be to one side of a plane passing through said centerline at right angles to the path of movement of said tool slide assembly, a counterbalance slide assembly equal in weight to said tool slide assembly and connected thereto, and means for simultaneously moving said assemblies in opposite directions.

7. The combination according to claim 6, said tool being on the opposite side of said plane from the center of gravity of said tool slide assembly.

8. The combination according to claim 7, further provided with means for rotating said lead screw comprising a drive shaft at right angles to the lead screw, and bevel gearing connecting said drive shaft and lead screw.

9. In a boring head, a housing adapted to be secured to a hollow spindle, a tool slide assembly supported by said housing for lateral movement with respect to the spindle centerline, a lead screw within said housing, thrust and radial bearing means carried by said housing for rotatably supporting said lead screw, a first thread on said lead screw, a nut on said first thread connected to said tool slide assembly, a counterbalance slide assembly comprising at least one weight, the entire counterbalance slide assembly being slidably mounted within said housing, a second thread on said lead screw of opposite hand to said first thread, a second nut on said second thread connected to said counterbalance slide assembly, a drive shaft rotatably supported by said housing coaxially with the spindle centerline, means operatively connecting said drive shaft to said lead screw, and means for limiting the extreme positions of the tool slide assembly, the positions of said limiting means relative to the center of gravity of said tool slide assembly and said spindle centerline being such that at all points between said extreme positions said center of gravity will be to one side of a plane passing through said centerline at right angles to the path of movement of said tool slide assembly.

10. In a boring head, a tool slide assembly adapted to be secured to a spindle, means for moving said tool slide assembly in a direction lateral to the spindle axis between first and second extreme positions, limit means defining said extreme positions such that the center of gravity of said tool slide assembly has a first extreme position substantially in a plane passing through the spindle centerline at right angles to the path of tool slide movement, a counterbalance slide assembly of weight equal to that of said tool slide assembly and connected thereto, means for simultaneously moving said tool slide and counterbalance slide assemblies in opposite directions, the counterbalance slide assembly being in first and second extreme positions when said tool slide assembly is in its first and second extreme positions respectively, and means for positioning the center of gravity of said counterbalance slide assembly when in its first extreme position between a first location substantially in said plane and a second location spaced from said first location a distance in the direction of movement of said tool slide assembly when moving from its first to its second extreme positions equal to the length of movement of the counterbalance slide assembly between its extreme positions.

11. In a boring head, a tool slide assembly, means for securing said assembly to a spindle, means for adjusting said assembly laterally with respect to the spindle centerline while so attached, means for limiting the extreme positions of said adjustment, a counterbalance slide assembly equal in weight to said tool slide assembly and connected thereto, means for simultaneously moving said assemblies in opposite directions comprising a single lead screw having coaxial threads of opposite hand, a first nut on said first thread connected to said tool slide assembly, a second nut on said second thread connected to said counterbalance slide assembly, and thrust bearing means for said lead screw, the relative positions of said slide assemblies being such that the thrust forces created by them on said lead screw during rotation of said boring head will counteract each other.

12. In a method for step boring with a boring spindle having a radially adjustable single point tool slide and a counterbalance for said tool slide, the steps of simultaneously adjusting said tool and counterbalance slides so that their respective centers of gravity are predetermined radial distances from the spindle axis and the tool on said tool slide is also a predetermined radial distance from said spindle axis, rotating the spindle with said tool and counterbalance slides, relatively moving said spindle and a workpiece in an axial direction while continuing said rotation to bore a first diameter in the workpiece, simultaneously and equidistantly moving said tool and counterbalance slide in diametrically opposite directions while continuing to rotate said spindle to position said tool at a second predetermined radial distance from said spindle axis which is shorter than said first distance, and causing further relative axial movement between said spindle and workpiece whereby a second diameter will be bored in said workpiece which is smaller than said first bored diameter.

References Cited in the file of this patent

UNITED STATES PATENTS

| | | |
|---|---|---|
| 81,664 | Millerd | Sept. 1, 1868 |
| 548,539 | Harden | Oct. 22, 1895 |
| 1,446,662 | Samuel | Feb. 27, 1923 |
| 1,814,919 | Hartwell | July 14, 1931 |
| 1,959,140 | Peterson | May 15, 1934 |
| 2,093,743 | Steiner | Sept. 21, 1937 |
| 2,283,323 | Erhardt | May 19, 1942 |
| 2,364,764 | Wilks | Dec. 12, 1944 |
| 2,402,650 | Maffia | June 25, 1946 |
| 2,901,935 | Keller et al. | Sept. 1, 1959 |
| 2,944,436 | Pickles | July 12, 1960 |